(No Model.)
O. F. SCHUMANN.
BOLT FOR ATTACHING ARTICLES TO WALLS.
No. 499,444. Patented June 13, 1893.
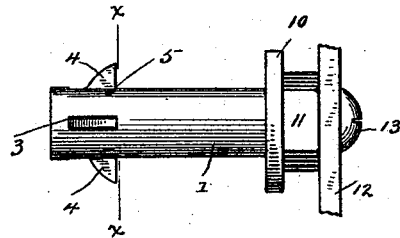
Fig. 1.
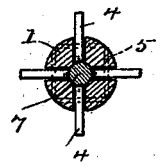
Fig. 2.
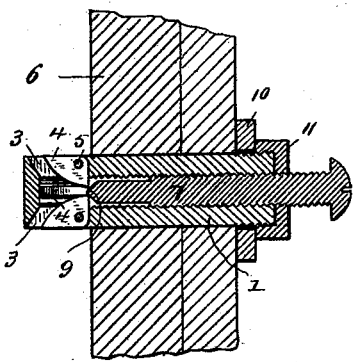
Fig. 4.
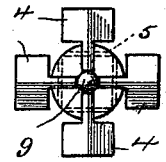
Fig. 5.
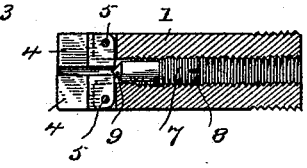
Fig. 6.
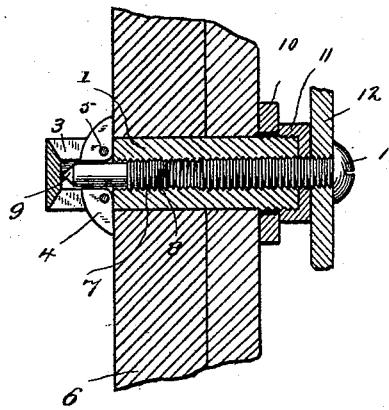
Fig. 3.
Fig. 7.
WITNESSES
H. A. Laub
Pearl Reynolds
INVENTOR
Otto F. Schumann
By
A. M. Wooster
Atty.

UNITED STATES PATENT OFFICE.

OTTO F. SCHUMANN, OF BROOKLYN, NEW YORK.

BOLT FOR ATTACHING ARTICLES TO WALLS.

SPECIFICATION forming part of Letters Patent No. 499,444, dated June 13, 1893.

Application filed April 7, 1893. Serial No. 469,428. (No model.)

*To all whom it may concern:*

Be it known that I, OTTO F. SCHUMANN, a citizen of the United States, residing at Brooklyn, in the county of Kings and State of New York, have invented certain new and useful Improvements in Bolts for Attaching Articles to Walls; and I do hereby declare the following to be a full, clear, and exact description of the invention, such as will enable others skilled in the art to which it appertains to make and use the same.

My invention has for its object to provide a bolt for general use as for example by plumbers, electricians, &c., in putting up brackets and other fixtures upon marble or upon hollow or fire brick or corrugated metal and plaster walls, in fact upon any wall or hollow article which can be operated upon only from the face. In order to produce a bolt of this class which shall be simple and inexpensive, easy to operate, firm and rigid after insertion and at the same time capable of being readily removed without injury to wall or bolt, I have devised the simple and novel construction which I will now describe referring by numbers to the accompanying drawings forming part of this specification in which—

Figure 1 is a side elevation illustrating my novel bolt in operative position as in use; Fig. 2 a section on the line $x\,x$ in Fig. 1 looking toward the left; Fig. 3 a vertical section of a wall with my novel bolt in use holding an article thereto; Fig. 4 a section corresponding substantially with Fig. 3 illustrating a form of my invention in which but one screw is used, and Fig. 5 is an end view in the closed position; Fig. 6 an end view in the opened position, and Fig. 7 a longitudinal section illustrating a form of my invention, in which the wings are cast and extend beyond the body.

1 denotes the body of the bolt which is tubular and is provided with an internal screw thread and at its outer end with an external screw thread, and is provided at its inner end with slots 3 in which wings 4 are pivoted, said wings being of such shape and pivoted in such a manner, as to adapt them to lie in line with the body as in Figs. 4, 5 and 7, or to be thrown outward on the inner side of a wall to which it is desired to attach a bracket or other object as in Figs. 1, 3 and 6. These wings may be blanked out from sheet metal as in Figs. 1 to 4 inclusive and adapted to lie wholly within the slots in the body or may be cast in such form as to extend beyond the body as in Figs. 5, 6 and 7. The wings are secured in slots 3 by pins 5 which are driven through the body as clearly shown in the drawings.

7 denotes an expanding screw which is provided with a slot 8 to receive a screw driver, and the inner end of which is unthreaded and is provided with a beveled point 9. This beveled point, when the screw is turned inward passes between the wings and forces them outward from their normal position as in Figs. 4 and 7, to the position shown in Figs. 1, 3 and 6.

10 is a washer which may or may not be used on the outer side on the wall.

11 is a nut which is adapted to engage the external thread on the body and to cover the outer end thereof, and is provided with a threaded central opening corresponding with the internal thread of the body.

12 indicates any object as for example a bracket, which it is desired to secure to the wall, and 13 is a holding screw which is threaded to engage the central opening in the nut and in the body to hold the object in place after the bolt has been inserted.

The operation is as follows: A suitable opening is first made in the wall through which the body is passed. As soon as the slots in the head have cleared the inner side of the wall the body is held firmly by a pair of pliers or in any suitable manner and the expanding screw is turned in until the wings are expanded or until the beveled point touches the head which serves as a stop. This screw holds the wings so they cannot be forced inward under any circumstances until the screw is withdrawn. The body may then be drawn outward slightly if necessary until the wings lie closely against the inner side of the wall, after which nut 11 is screwed down upon the outer end of the body which clamps the body firmly to the wall, marble or sheet of metal to which it is attached. The holding screw is then passed through the bracket or other article it is desired to secure in place, through the nut and is caused to engage the internal thread of the body. The wings may be made to fit closely enough in the slots so that they will not drop down, or if preferred may be made to fit loosely and retained in place until after insertion by winding a strip of paper around the body which will of course be burst by the wings as soon as the expanding screw is forced in. In practice however I do not find this necessary. When it is desired to remove the bolt it is simply necessary to turn the expanding screw outward far enough to release the wings after which the body may be readily drawn outward. The wings are forced back into the slots, as in Fig. 4 by engagement with the inner side of the wall when the body is drawn out. In the form illustrated in Fig. 4 an independent expanding screw is dispensed with. The holding screw is made the full length of the opening and is provided with a reduced inner end and beveled point so that when it is turned into place it will not only hold the bracket or other article in place, but will also expand the wings upon the inner side of the wall.

Having thus described my invention, I claim—

1. A bolt of the character described consisting of a body having an internal screw thread and provided at its inner end with slots 3, wings pivoted in said slots, and adapted to lie in line with the head or to be thrown outward, and an expanding screw engaging the thread in the body and acting to throw the wings outward.

2. A bolt of the character described consisting of a body having internal and external screw threads and slots 3 at its inner end, wings pivoted in said slots and adapted to lie in line with the head or to be thrown outward, an expanding screw engaging the internal thread and acting to throw the wings outward, and a nut engaging the external screw thread by which the body is clamped in place.

3. A bolt of the character described consisting of a body having internal and external screw threads and provided at its inner end with slots 3, wings 4 pivoted in said slots, an expanding screw engaging the internal thread and provided with a conical point adapted to expand the wings, a nut engaging the outer end of the body by which it is clamped in place, and a holding screw engaging the internal thread and passing through the nut and engaging the body by which an article may be secured to the wall.

In testimony whereof I affix my signature in presence of two witnesses.

OTTO F. SCHUMANN.

Witnesses:
J. L. PERSON,
JACOB BAUER.